Oct. 31, 1933.  T. F. CULLINAN  1,932,957
AUTOMOBILE GAS TANK LOCKING MECHANISM
Filed March 2, 1933  2 Sheets-Sheet 1
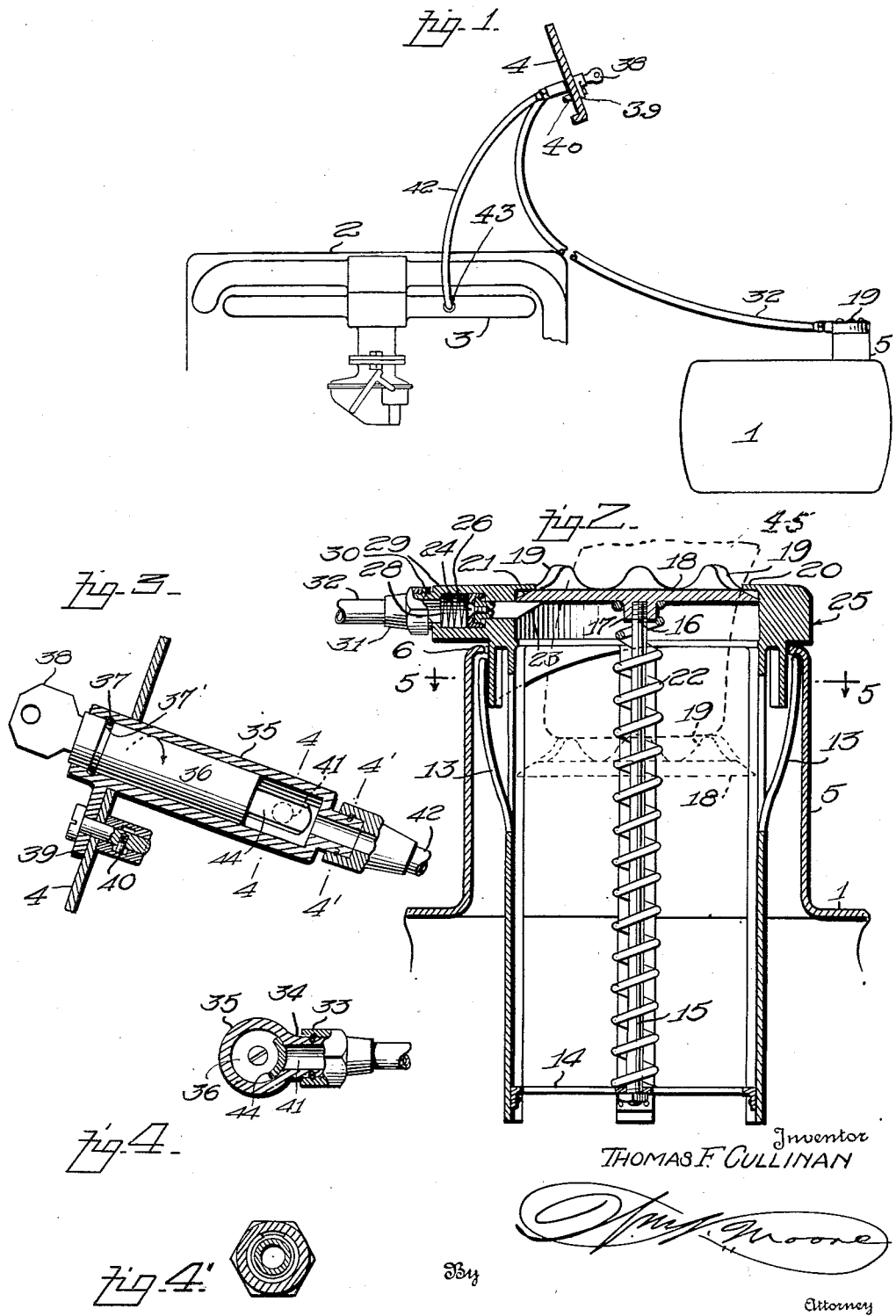
Inventor
THOMAS F. CULLINAN
By
Attorney Oct. 31, 1933.  T. F. CULLINAN  1,932,957
AUTOMOBILE GAS TANK LOCKING MECHANISM
Filed March 2, 1933  2 Sheets-Sheet 2
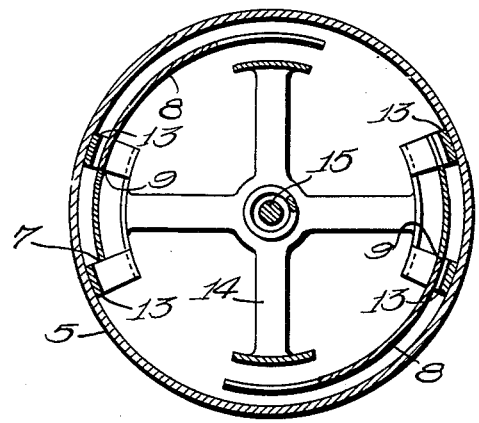
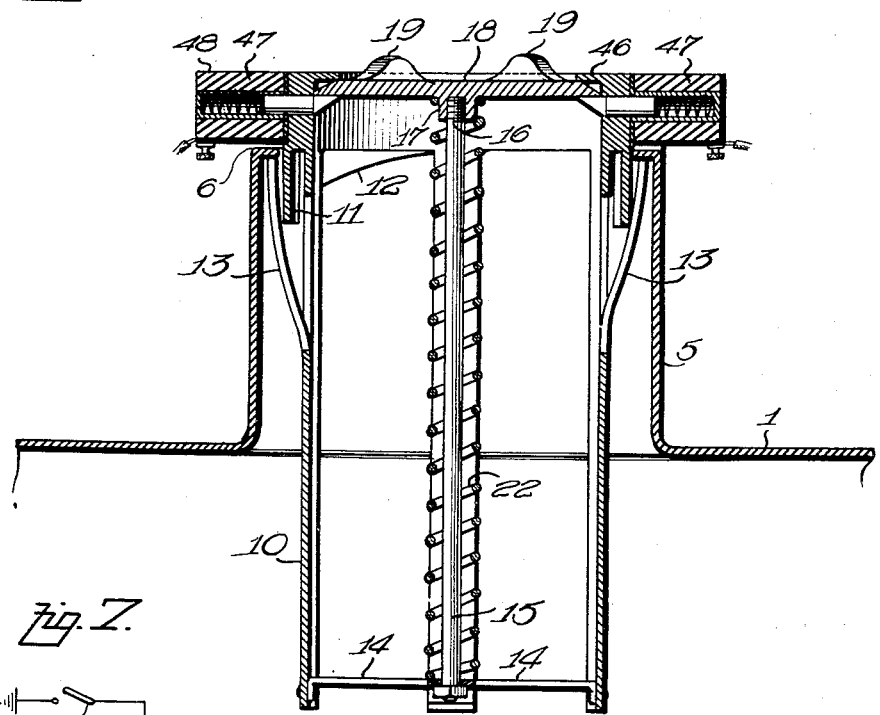
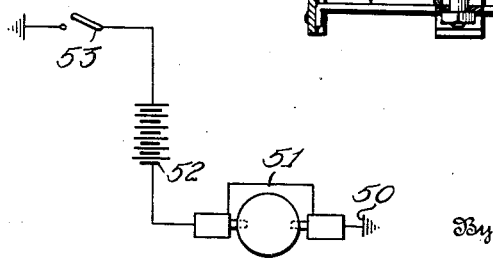
Inventor
THOMAS F. CULLINAN Patented Oct. 31, 1933

1,932,957

UNITED STATES PATENT OFFICE 1,932,957

AUTOMOBILE GAS TANK LOCKING MECHANISM

Thomas F. Cullinan, Johnson City, Tenn.

Application March 2, 1933. Serial No. 659,356

9 Claims. (Cl. 70—90)

My invention relates to improvements in gasoline tank locks, particularly adapted for use upon tanks of automobiles, although the lock may be used for any purpose where it would perform its functions in a practical manner.

One object of my invention is the provision of a gasoline tank locking mechanism which will be capable of being operated and controlled by air pressure or by electrical magnetized coils, and which will prove efficient under either construction.

Another object of my invention is the provision of a gasoline tank locking mechanism which is under the control at all times of the driver or operator of the vehicle actuated by air pressure and under all times and conditions remains locked and thus prevents the theft of the gasoline.

Another object of my invention is the provision of a gasoline tank locking mechanism which normally remains locked to guard and protect against the theft of gasoline from the tank, and will allow the driver of the vehicle to instantly open the filling portion of the tank by air pressure for the refueling of the tank, and which when gasoline refueling nozzle will be removed from filling cap the lock mechanism will return and be in a locked condition.

Another object of my invention is the provision of a gas tank locking mechanism which can be readily applied to tanks at the time of manufacture, or upon tanks in general use at a small expense to make its use necessary and desirable.

Another object of my invention is the provision of a mechanism of the character and for the purpose stated, which will comprise few parts insuring simplicity, durability and long life and which will be absolutely reliable and certain in action in every particular and will prove efficient, practical and an economical adjunct.

With these objects in view, my invention consists of a gasoline tank locking mechanism embodying novel features of construction and combination of parts for service, substantially as described and claimed and as shown in the accompanying drawings, in which:

Figure 1 represents a view in elevation, showing the tank, engine and manifold and the air pressure control element on the dash applied in relative position thereto.

Figure 2 represents a vertical central sectional view of the locking portion of my invention applied to the filling mouth or spout of the gasoline tank with the cover shown in full lines in locked or normal position, and in dotted lines the position of the cover when the tank lid is open for refueling purposes.

Figure 3 represents a detail view in section and elevation of the air pressure control mechanism which is mounted on the dash or instrument board of the vehicle.

Figure 4 represents a sectional view on the line 4—4 of Figure 3.

Figure 4' represents a sectional view on the line 4' of Figure 3.

Figure 5 represents a sectional view taken on line 5—5 of Figure 2.

Figure 6 represents a vertical central sectional view of a modified form of my locking mechanism adapted for electrical control and operation.

Figure 7 represents a wiring diagram of the complete electrically controlled and operated mechanism.

Referring by numerals to the drawings, in which the same numerals of reference denote the same parts in all the figures of the drawings:

The numeral 1 designates the gasoline tank, 2 the engine, 3 the manifold and 4 the dash or instrument board of any construction and in connection with which my improvements are used.

The tank is provided with the raised mouth 5, which is open throughout and has curved rim 6, provided with the cut out or recessed portions 7, forming the flanges 8, terminating in the oppositely arranged lugs 9, forming stops and fitting in said rim portions of the mouth is the cylindrical member 10, which is provided with the depending flanges 11, which when in locked position bear against the cams 12, of the rim and also said cylindrical member is provided with the series of tongues 13, which when the member is mounted into the mouth of the tank assume the position shown in Figures 2 and 6, and form a locking engagement with the rim of the mouth and prevent both removal and rotation of said cylindrical member, as will be readily understood from said Figures 2 and 6.

In the lower portion of said member is mounted the frame or spider 14, which forms a guide for the rod 15, whose upper end 16 is fastened and engages the threaded nipple 17 on the cover or lid 18 which is provided with lugs 19. On its upper face, which is confined in the annular flange 20 of the cylindrical member said cover is provided with the inclined or beveled edge 21, and which cover is normally held in closed or locked position against said annular flange 20 by means of the coiled spring 22, which surrounds the rod 15 and exerts its compression against the cover and spider to always force the cover to closed position, as will be evident by reference to Figures 2 and 6.

From the description and drawings it will thus be noted that normally the cover is closed, and to retain said cover in secure and locked position I provide the inclined latch bolt 23, mounted in a passage 24, of the rim 25, and connected to the plunger 26, in the chamber 27, which is retained normally in position to lock the cover, as shown in Figures 2 and 6, by means of a light coiled spring 28.

The incline or bevel of the catch or latch 23 corresponds with the incline or bevel 21 of the cover, and thus when the cover is forced upward under the action of the coiled spring 22, said inclined edge of the cover will ride upon the inclined portion of the said latch and move the latch inward into passage 24, allowing the cover to pass latch and then seat itself in the cylindrical member in locked position.

The extension of lug 29 is provided with a nipple 30, with which is coupled the ferrule 31, from which leads pipe 32 and which at its terminal is connected by the coupling 33, with the nipple 34, on the sleeve 35, which is rotatably mounted the key operated member 36, retained in place by the locking ring 37 and groove 37', and such member is operated by means of the key 38, which is inserted into slot in said member, as shown in Figure 3.

This structure forms the air pressure operating and control mechanism and is fitted and secured to the dash-board by means of the flange 39 and the securing means 40, as seen in Figure 3, and the sleeve 35 is provided at one side with the air outlet 41, from which leads the pipe 42 to the manifold at 43. Thus when the key operated member is given a quarter turn the cut off 44, which is secured at end of lock to uncover said inlet, and the air pressure produced from the motor from the manifold instantly draws the catch from under the cover, and the said cover may then be moved downward for the purpose of refueling by the weight of spout 45, as shown in dotted lines in Figure 2, and the tank then being refueled the cover will be forced upward to closed position by spring 22, on vertical rod of lid, and the catch under the impulse or tension of spring 28, will be forced to locked position, as shown in Figure 2, and lock the cover securely in place.

From the foregoing description taken in connection with the drawings the operation of my tank locking mechanism will be readily understood, and when it is desired to refuel the tank the driver gives the key operated member a quarter turn, 90° to the right, which rotation or action uncovers the port 41, in cylindrical reservoir or lock housing. This air pressure coming direct from intake manifold by way of the pipe which leads to the cylindrical reservoir retaining lock on the dash-board. Then the port hole being open the air pressure from motor by way of the outlet on dash retracts said latch and permits depression of the cover to allow refueling of the tank. After refueling is accomplished, the port or outlet is closed and the cover instantly returns and assumes locked position entirely automatically.

It will thus be seen that my locking mechanism comprises a tank, a cover carrying member mounted in the filling opening of the tank, a spring pressed normally closed cover or closure, a locking mechanism in the cover carrying member, and a manually operated and controlled means associated with the locking means and the manifold to allow the vacuum or suction action from the manifold to release the cover locking mechanism to permit the cover to be depressed and allow filling of the tank.

In the form of my invention shown in Figures 6 and 7 and which is operated electrically the construction of the mechanism which is mounted in the tank is the same practically as the other form of my invention, except that the rim 46 of the cylindrical member is provided with a pair of chambered ears 47, in which are placed solenoids 48, in which the spring latches 49 are placed while leading to the solenoids are the ground connection 50, the bridging connection 51, the battery 52, and the switch 53, and this form of my invention operates in exactly the same manner as the suction or vacuum operated form, as will be evident.

I claim:

1. In a gasoline tank locking mechanism, the combination of a tank, a raised mouth portion for said tank, a cylindrical member fitting in said mouth portion, means for locking said member in said mouth portion, a cover for said member, a rod depending from said cover, a frame for guiding said rod, a spring around said rod, an inclined latching means for locking said cover, and an inclined edge on said cover for co-acting with said inclined latching means.

2. In a gas tank locking mechanism, the combination of a gas tank having its filling opening provided with a neck around said opening, a cover carrying member adapted to fit and lock in said neck portion, a rim on said member, a flange around the inner edge of said rim for holding the cover when closed, a vertically movable rod in said member, a cover connected to said rod at its upper end and formed with an inclined edge, a spring around said rod for normally forcing the cover to closed position, a spring actuated latch mounted in the cover carrying member and having an inclined portion to co-act with said inclined portion or edge of the cover, and means for withdrawing said latch to permit the cover to be depressed to allow filling of said tank.

3. In a gas tank locking mechanism, the combination of a tank having a vertically disposed filling opening, a tubular member mounted in said opening, a vertically movable cover fitting in said tubular member, means for guiding and holding said cover in normally closed position, a locking mechanism disposed in said tubular member and acting to lock said cover under normal conditions by projecting beneath the cover to prevent its depression, and means associated with said locking mechanism for withdrawing said locking mechanism to allow depression of said cover to permit filling of the tank.

4. In a gas tank locking mechanism, the combination of a tank having a vertically disposed filling opening, a tubular member mounted vertically and locked in said filling opening, a cover fitting in said tubular member and vertically movable therein, a guide for said vertically movable cover, spring means disposed in said tubular member and serving to normally force the cover to closed position, a locking means for said cover mounted horizontally in said tubular member and adapted to lock said member when in normally closed position by projecting beneath the cover to prevent its depression, and means associated with said horizontally disposed locking mechanism for releasing said mechanism and allowing the cover to be depressed to permit filling of the tank.

5. In a gas tank locking mechanism, the combination of a tank having a neck portion around its filling opening, a vertically disposed tubular member fitting within said neck and having a locking connection therewith, a vertically movable cover fitting in said tubular member, a rod depending from said cover, a guide in said tubular member to receive said rod, a spring around said rod to force said cover to closed position, a locking mechanism carried by said tubular member for engaging and locking said cover and comprising a spring latch bolt adapted to project beneath the cover to prevent its depression, and means for releasing said cover locking mechanism to allow said cover to be depressed to permit filling of the tank.

6. In a gas tank locking mechanism, the combination of a tank having a raised neck portion around its filling opening provided with recesses and flanges contiguous with said recesses, a tubular member having a series of spring tongues adapted to enter said recesses and interlock with said flanges to lock the tubular member in position, a cover fitting said tubular member and vertically movable therein, means for normally forcing said cover to a closed position, means for engaging and locking said cover when closed, and means for releasing said locking mechanism to allow the cover to be depressed to permit filling of the tank.

7. In a gas tank locking mechanism, the combination of a tank having a raised neck portion around its filling opening provided with a series of recesses and contiguous flanges, a tubular member having a series of spring tongues adapted to enter said recesses and interlock with said flanges to lock the said tubular member in position, a cover fitting and having a vertical movement in said tubular member, means carried by said tubular member to confine and limit the upward movement of said cover, a spring for forcing said cover upwardly against said confining means, locking means carried by said tubular member for engaging and locking said cover when closed by projecting beneath the cover to prevent its depression, and means for releasing said locking means to allow the cover to be depressed to permit filling of the tank.

8. In a gas tank locking mechanism, the combination of a tank having a raised neck portion around its filling opening, a tubular member fitting and locked in said neck portion, a rim around the upper edge of said tubular member having an inward projecting annular flange and in its periphery a chamber, a spring actuated plunger in said chamber, a latch bolt connected with and operated by said plunger, a cover fitting in said tubular member and confined in its upward movement by said annular flange of said tubular member and locked in said confined position by said latch bolt projecting beneath said cover, means for guiding said cover in said tubular member, spring means for forcing said cover to closed position and to locking engagement with said latch bolt, and means for releasing said latch bolt from engagement with said cover to allow depression of said cover to permit filling of the tank.

9. In a gas tank locking mechanism, the combination with a tank having a vertically disposed filling opening, a raised neck portion around said filling opening provided with a series of recesses and contiguous flanges, a tubular member having a series of spring tongues adapted to enter said recesses and lock with said flanges, a cover fitting in said tubular member, a rod depending from said cover, a frame in said tubular member serving as a guide for said rod, a spring around said rod to force said cover upward to closed position, a flange on said tubular member to confine said cover when closed, a locking mechanism carried by said tubular member to engage and lock said cover when closed by projecting beneath the cover to prevent its depression, and means for operating said locking mechanism to effect its release and allow the cover to be depressed to permit filling of the tank.

THOMAS FRANCIS CULLINAN.